United States Patent
Benavides et al.

(10) Patent No.: US 6,740,224 B1
(45) Date of Patent: May 25, 2004

(54) METHOD OF MANUFACTURING CARBON NANOTUBES

(75) Inventors: Jeanette M. Benavides, Alexandria, VA (US); Henning W. Leidecker, College Park, MD (US); Jeffrey Frazier, Stevensville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/173,533

(22) Filed: Jun. 11, 2002

(Under 37 CFR 1.47)

Related U.S. Application Data

(60) Provisional application No. 60/296,739, filed on Jun. 11, 2001.

(51) Int. Cl.⁷ .............................. C25C 1/00; C01B 31/00
(52) U.S. Cl. ........................................ 205/615; 204/173
(58) Field of Search ........................... 204/173; 205/615

(56) References Cited

U.S. PATENT DOCUMENTS

| | | | | |
|---|---|---|---|---|
| 5,753,088 A | * | 5/1998 | Olk | 204/173 |
| 5,783,263 A | | 7/1998 | Majetich et al. | |
| 6,063,243 A | * | 5/2000 | Zettl et al. | 204/164 |
| 6,149,775 A | | 11/2000 | Tsuboi et al. | |
| 6,451,175 B1 | * | 9/2002 | Lal | 204/173 |

FOREIGN PATENT DOCUMENTS

JP     2000203820 A   *   7/2000

* cited by examiner

*Primary Examiner*—Donald R. Valentine
(74) *Attorney, Agent, or Firm*—Keith L. Dixon

(57) ABSTRACT

A process for manufacturing carbon nanotubes, including a step of inducing electrical current through a carbon anode and a carbon cathode under conditions effective to produce the carbon nanotubes, wherein the carbon cathode is larger than the carbon anode. Preferably, a welder is used to induce the electrical current via an arc welding process. Preferably, an exhaust hood is placed on the anode, and the process does not require a closed or pressurized chamber. The process provides high-quality, single-walled carbon nanotubes, while eliminating the need for a metal catalyst.

24 Claims, 1 Drawing Sheet

… (US 6,740,224 B1)

METHOD OF MANUFACTURING CARBON NANOTUBES

CROSS-REFERENCE TO RELATED APPLICATION

The present application claims the benefit of U.S. Provisional Application Serial No. 60/296,739, filed Jun. 11, 2001, which is hereby incorporated by reference in its entirety.

ORIGIN OF INVENTION

The invention described herein was made by employees of the United States Government, and may be manufactured and used by or for the Government for governmental purposes without the payment of any royalties thereon or therefor.

TECHNICAL FIELD

This invention relates to the field of manufacturing carbon nanotubes, and more particularly, but not by way of limitation, to methods of manufacturing high-quality, single-walled carbon nanotubes.

BACKGROUND ART

Carbon exists in various molecular configurations, including diamond, graphite, fullerene, and carbon nanotube (CNT).

The CNT form of carbon was discovered relatively recently. Each CNT is a long, thin cylinder of carbon, with a diameter that can be as small as 1 nm and a length that can range from a few nanometers to one or more microns. A CNT may be thought of as a sheet of graphite, i.e., a hexagonal lattice of carbon, rolled into a cylinder.

A CNT may have a single cylindrical wall (SWCNT), or it may have multiple walls (MWCNT), giving it the appearance of cylinders inside other cylinders. A SWCNT has only a single atomic layer, whereas a MWCNT may contain, for example, from 100 to 1,000 atomic layers. Generally, SWCNTs are preferred over MWCNTs because they have fewer defects and are therefore stronger and more conductive than MWCNTs of similar diameter.

A CNT is considered to be the smallest known man-made structure that is self-supporting and chemically inert in the atmosphere. It may be conducting or semiconducting, depending on its diameter and helicity of arrangement (chirality) of graphite rings in its wall(s). The electrical conductivity of a CNT is roughly six times that of copper. Each CNT is as stiff as a diamond and exhibits extraordinary mechanical strength.

One of the most promising applications for CNTs is in nanotechnology, including the manufacture of reinforced composites and nano-electromechanical systems (NEMs). Briefly, nanotechnology science and engineering concerns the control of structures and devices at atomic, molecular, and supramolecular levels in order to create relatively large structures with a fundamentally new molecular organization. Many molecules may be used to make nanodevices and nanostructures, but the most promising and powerful because of their unique properties are the CNTs.

Several techniques exist for making CNTs, each requiring expensive equipment and/or the use of metal catalysts. For example, CNTs are currently manufactured in laboratories via laser ablation, electric-arc, or chemical vapor deposition (CVD) processes. Laser ablation and electric-arc techniques tend to (i) produce SWCNTs in small amounts (milligram to gram in a few hours) and (ii) employ metal catalysts. These catalysts may be difficult to completely remove from post-production CNTs, even after extensive cleaning and purification. Electric-arc techniques also require a closed or pressurized chamber, which can be costly and dangerous. There is also a CVD process used to grow nanotubes on patterned substrates, but it is more suitable for the development of nanoelectronic devices and sensors.

Another commonly used procedure is the HiPco process. The HiPco process has a good potential for large scale manufacturing of nanotubes. A major drawback of the HiPco process, however, is that it requires pressurized carbon monoxide, very high temperatures, and a metal catalyst that is difficult to remove at the end.

In short, there exists a need for a simple, low-cost method of manufacturing high-quality, single-walled carbon nanotubes that eliminates the need for extensive cleaning and purification of the CNT product.

STATEMENT OF INVENTION

It is an object of the present invention to provide a process of manufacturing carbon nanotubes.

It is another object of the present invention to provide a process of manufacturing single-walled carbon nanotubes.

It is a further object of the present invention to provide a simple, inexpensive process of manufacturing single-walled carbon nanotubes.

It is a still further object of the present invention to provide a metal catalyst-free process of manufacturing carbon nanotubes.

To achieve these objects of the invention, there is provided a process of manufacturing carbon nanotubes, comprising a step of inducing electrical current through a carbon anode and a carbon cathode under conditions effective to produce the carbon nanotubes, wherein the carbon cathode is larger than the carbon anode. Preferably, a welder is used to induce the electrical current via an arc welding process. Preferably, an exhaust hood is placed on the anode, and the process does not require a closed or pressurized chamber.

The present process is able to produce single-walled and multi-walled carbon nanotubes, while eliminating the need for (i) a metal catalyst and (ii) a closed or pressurized chamber. Consequently, the present process avoids the costly and potentially dangerous steps that have heretofore compromised other processes for manufacturing carbon nanotubes.

DETAILED DESCRIPTION OF THE INVENTION

Figure 1:
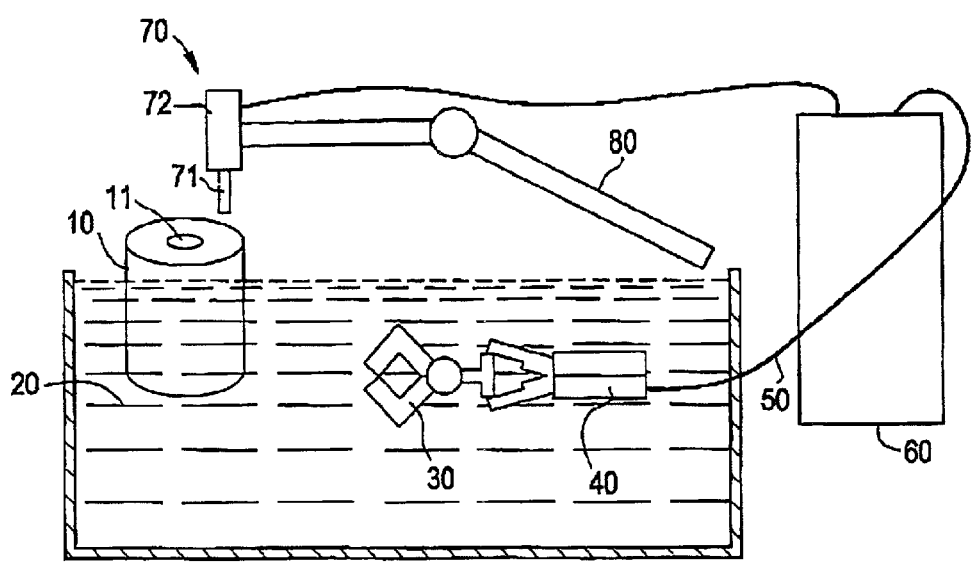
FIG. 1 is a schematic view of an arc-welding apparatus prepared to practice the process of the present invention.

The present process comprises the application of electrical current to a carbon anode and a carbon cathode under conditions effective to produce single-walled carbon nanotubes (SWCNTs), as described in more detail below.

Suitable forms of carbon that can be used as the cathode and/or the anode include graphite, activated carbon, decolorizing carbon, and mixtures thereof. The composition of the cathode and the anode may be the same or different. Preferably, solid carbon in the form of graphite is used as one or both of the cathode and the anode.

The carbon cathode according to the present invention is larger than the carbon anode. While the absolute diameters of the cathode and anode are not particularly limited, the anode is preferably a cylindrical rod having a diameter of from 0.30 cm to 0.65 cm (⅛ in to ¼ in) and the cathode is preferably a cylindrical round having a diameter of at least 5 cm (2 in). The lengths of the anode and cathode are not particularly limited.

The carbon cathode may preferably have a bore in its center. The diameter of the bore is not particularly limited. In addition, the cathode may be partially immersed in a tank of water for cooling and a circulating water system may be provided to cool the anode.

Electrical current may be induced through the anode and cathode by using an arc-welding power source. A gap of from about 0.10 cm to about 0.5 cm, preferably from about 0.15 cm to about 0.3 cm (1/16 inch to ⅛ inch), is maintained between the anode and the cathode throughout the process.

Electrical current is induced through the anode and the cathode in an inert atmosphere, such as helium. The inert atmosphere may contain minor amounts of other gases, such as hydrogen, oxygen, nitrogen, or water, provided the other gases do not unacceptably interfere with the process of the present invention. An exhaust hood may be placed over the anode to direct the flow of gas downward.

Inducing an electrical current through the anode and the cathode vaporizes the carbon anode, and forms a deposit on the surface of the cathode. In some of the experimental runs conducted by the inventors, the deposit formed on the cathode is sand castle-shaped. The electrical current is allowed to consume the anode until, for example, a sintered tip of the anode is level with the exhaust hood. The deposit may then be removed from the cathode block and placed into, for example, a glass beaker. The sintered tip of the anode is also removed and placed into the glass beaker. Preferably, the first 5 cm of the anode may be removed. The collected material in the glass beaker(s) is ground and purified.

The present process does not require the use of a metal catalyst. Therefore, one advantage of CNTs produced by a process according to the present invention is that the CNTs do not require extensive cleaning and purification.

A second advantage is that CNTs manufactured according to the present invention decompose at a relatively high temperature. For example, a CNT manufactured according to the process of the present invention may decompose at about 650° C., whereas 500° C. is a typical decomposition temperature of CNTs produced by other means.

A third advantage of the present manufacturing process is that it does not require a complex cooling system. The cathode may be simply immersed in a tank of water for cooling.

In addition, the present process does not require a closed or pressurized chamber, as is common with other methods, including the electric-arc method, the HiPco process, the microwave method, and CVD deposition. Therefore, it is cost-effective and much less dangerous.

Referring to FIG. 1, there is shown a schematic view of an example of a fabrication setup for manufacturing high-quality, single-walled carbon nanotubes (SWCNTs) in accordance with the process of the present invention. The setup comprises a carbon round 10 functioning as a cathode, with a portion of the carbon round protruding above the surface of the cooling water bath 20. The carbon round 10 includes a bore 11 in its center. The carbon round 10 is held by a Kent-type twist clamp 30, which rests horizontally on a brick (not shown) submerged next to the carbon round 10 in the cooling water bath 20. Attached to the clamp 30 is a jumper cable-type clamp 40 connected to the grounding cable 50 of a welding power source 60. The anode assembly 70 is mounted securely to a surface guide 80, which has a thumb knob (not shown) for controlling vertical movements. A carbon rod 71 is inserted into the anode assembly 70, and a small hood 72 is placed on the anode to direct the gas flow downward. The anode assembly 70 is placed over the face of the carbon round 10 at a distance between the edge of the round and the center of the bore 11.

The present inventors have completed several runs in accordance with the process of the present invention, using both carbon and graphite as the anodes and the cathodes. Sample lots of CNTs produced by the present method have been subjected to preliminary material characterization and analysis. CNTs produced by the present process may be characterized by using any of several analysis techniques, including, but not limited to, scanning electron microscopy (SEM), transmission electron microscopy (TEM), X-ray Diffraction (XRD), energy loss spectroscopy (EELS), Raman spectroscopy (RS), and thermal gravimetric analysis (TGA).

It takes approximately three minutes to produce one batch of about 1 gram of SWCNT material.

By optimizing one or more variables of the present process, such as the applied voltage, cooling temperature of the water bath, and electrode dimensions, the process may be further controlled in order to produce the desired type (conductive or semiconductive) and size of CNTs for different applications.

The CNTs produced by the present process exhibit extraordinary mechanical properties: a Young's modulus of over 1 Tera Pascal, a stiffness equal to a diamond, and tensile strength of roughly 200 GPa. Due to their outstanding strength-to-weight ratio and high overall mechanical strength, they are suitable for a wide variety of mechanical applications, including as composite structural materials for spacecrafts, cables, tethers, beams, heat exchangers, radiators, body armor, spacesuits, etc. The CNTs also have potential application in micro-spacecraft, such as micro- and nano-rovers for planetary explorations.

In addition, the CNTs, which may (i) be conducting or semiconducting, (ii) have tunable bandgap, and (iii) have a very high current-carrying capacity, are suitable for a wide variety of electrical applications. For example, the CNTs may be used in sensors for force, pressure, chemical measurements; biosensors for astro-biology; batteries and fuel cells; biomedical procedures and instrumentation systems; CNT-based tips in atomic force microscopy (AFM) for nano-manipulation and imaging. Furthermore, CNT-based diodes have been developed, and can be the basis for molecular electronics for quantum computing.

The following example is a detailed description of one embodiment of the present process. The detailed description falls within the scope of, and serves to exemplify, the more generally described process set forth above. The example is presented for illustrative purposes only, and is not intended as a restriction on the scope of the invention.

EXAMPLE

A welding power source, including an integrated helium gas delivery system and a circulating water system for the anode, was used to induce a high electrical current through a small diameter carbon rod into a larger area graphite cylinder.

The setup comprised a 2 inch (5.08 cm) diameter graphite round functioning as a cathode. The graphite round, which had a 5/8 inch (1.6 cm) diameter bore in its center, was placed in a water bath, with approximately 2 inches (5.08 cm) of the graphite round protruding through the surface of the cooling water bath. The graphite round was held by a large Kent-type twist clamp. The Kent-type clamp rested horizontally on a brick submerged in the water next to the graphite round. Attached to the Kent-type clamp was a jumper cable-type clamp connected to the welder's grounding cable.

The anode assembly was mounted securely to a surface level arm, which had a thumb knob for controlling the vertical movements. A 1/8 inch (0.3 cm) rod of graphite was inserted into the anode, and a 12 inch (30.5 cm) bell-shaped hood was placed on the anode to direct the gas flow downward. The anode was placed over the face of the graphite round at a distance halfway between the edge of the graphite round and the center of the graphite round.

The welding process was started and allowed to continue until the anode was consumed to the level of the exhaust hood, which was positioned at about 1.5 feet (45.7 cm) over the water bath. A 1/16 inch to 1/8 inch (0.15 cm to 0.3 cm) spark gap was maintained during the welding process.

As a result of the welding and receding anode, a sandcastle-shaped deposit was formed on the graphite round (cathode). The deposit was removed from the round and placed into a glass beaker. The sintered tip of the anode was also removed and placed in the glass beaker.

The setup can be prepared for another welding run by scrubbing the top of the graphite round with a wire brush, and either cleaning the anode by rubbing its end with sandpaper or replacing the anode with a new anode, if necessary.

While the invention has been described in detail and with reference to specific embodiments thereof, it will be apparent to those of ordinary skill in the art that various changes and modifications can be made therein without departing from the spirit and scope thereof.

What is claimed is:

1. A process for manufacturing carbon nanotubes, comprising:
    (a) providing a carbon anode and a carbon cathode, wherein the cathode is larger than the anode; and
    (b) partially immersing the cathode in a water bath; and
    (c) inducing electrical current through the anode and the cathode to produce carbon nanotubes.

2. The process of claim 1, wherein one or both of the anode and the cathode are graphite.

3. The process of claim 1, wherein the electrical current is induced by arc welding.

4. The process of claim 3, further comprising the step of blowing an inert gas over the welding area prior to inducing electrical current through the anode and the cathode.

5. The process of claim 4, further comprising the step of placing an exhaust hood over the anode in order to direct the inert gas.

6. The process of claim 5, wherein the process comprises maintaining a gap from about 0.10 cm to about 0.5 cm between the anode and the cathode during the arc welding process.

7. The process of claim 6, further comprising the step of allowing the electrical current to consume the anode such that a sintered tip of the anode is level with the exhaust hood, thereby forming a deposit on the cathode.

8. The process of claim 7, further comprising the steps of removing, grinding, and purifying (i) the deposit formed on the cathode and (ii) the sintered tip of the anode, thereby forming a purified material.

9. The process of claim 8, wherein the purified material contains single-walled carbon nanotubes (SWCNTs).

10. The process of claim 9, wherein said carbon cathode includes a bore in its center.

11. The process of claim 1, wherein steps (a) through (c) are performed at substantially atmospheric pressure.

12. A process for manufacturing carbon nanotubes, comprising:
    (a) providing a carbon anode and a carbon cathode,
    (b) partially immersing the cathode in a water bath; and
    (c) inducing electrical current through the anode and the cathode to produce carbon nanotubes.

13. The process of claim 12, wherein one or both of the anode and the cathode are graphite.

14. The process of claim 12, wherein the electrical current is induced by arc welding.

15. The process of claim 14, further comprising the step of blowing an inert gas over the welding area prior to inducing electrical current through the anode and the cathode.

16. The process of claim 15, further comprising the step of placing an exhaust hood over the anode in order to direct the inert gas.

17. The process of claim 16, wherein the process comprises maintaining a gap from about 0.10 cm to about 0.5 cm between the anode and the cathode during the arc welding process.

18. The process of claim 17, further comprising the step of allowing the electrical current to consume the anode such that a sintered tip of the anode is level with the exhaust hood, thereby forming a deposit on the cathode.

19. The process of claim 18, further comprising the steps of removing, grinding, and purifying (i) the deposit formed on the cathode and (ii) the sintered tip of the anode, thereby forming a purified material.

20. The process of claim 19, wherein the purified material contains single-walled carbon nanotubes (SWCNTs).

21. The process of claim 20, wherein said carbon cathode includes a bore in its center.

22. The process of claim 12, wherein steps (a) through (c) are performed at substantially atmospheric pressure.

23. The process of claim 12, wherein steps (a) through (c) are performed without a metal catalyst.

24. A process for manufacturing carbon nanotubes, comprising:
    (a) providing a carbon anode and a carbon cathode;
    (b) partially immersing the cathode in a water bath; and
    (c) inducing electrical current through the anode and the cathode to produce carbon nanotubes wherein steps (a) through (c) are performed at substantially atmospheric pressure and without a metal catalyst.

* * * * *